United States Patent
Ikuta et al.

(10) Patent No.: US 11,206,224 B2
(45) Date of Patent: Dec. 21, 2021

(54) SWITCH DEVICE AND RECORDING MEDIUM RECORDING FAILURE DETECTION PROGRAM

(71) Applicant: FUJITSU LIMITED, Kawasaki (JP)

(72) Inventors: Yuya Ikuta, Machida (JP); Takeshi Umezuki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 123 days.

(21) Appl. No.: 16/687,020

(22) Filed: Nov. 18, 2019

(65) Prior Publication Data
US 2020/0177520 A1  Jun. 4, 2020

(30) Foreign Application Priority Data
Nov. 30, 2018 (JP) .............................. JP2018-225058

(51) Int. Cl.
*H04L 29/06* (2006.01)
*H04L 12/933* (2013.01)
*H04L 12/24* (2006.01)
*H04L 12/26* (2006.01)

(52) U.S. Cl.
CPC .............. *H04L 49/10* (2013.01); *H04L 41/14* (2013.01); *H04L 43/0817* (2013.01); *H04L 63/101* (2013.01)

(58) Field of Classification Search
CPC ..... H04L 41/14; H04L 43/0817; H04L 49/10; H04L 63/101
See application file for complete search history.

(56) References Cited

U.S. PATENT DOCUMENTS

| | | | |
|---|---|---|---|
| 2006/0198315 A1* | 9/2006 | Sasagawa | H04L 69/40 370/244 |
| 2011/0238817 A1 | 9/2011 | Okita et al. | |
| 2015/0124591 A1* | 5/2015 | Nakagawa | H04L 41/0659 370/225 |
| 2016/0065423 A1* | 3/2016 | Zhang | H04L 47/125 370/235 |
| 2017/0078150 A1* | 3/2017 | Koganti | H04L 12/4633 |

FOREIGN PATENT DOCUMENTS

| | | |
|---|---|---|
| JP | 11-127196 A | 5/1999 |
| JP | 2011-205301 | 10/2011 |

* cited by examiner

*Primary Examiner* — Brian P Cox
(74) *Attorney, Agent, or Firm* — Fujitsu Patent Center

(57) ABSTRACT

A switch device includes: a memory; and a processor coupled to the memory and configured to: identify an adjacent switch device using a function that is operable even when a function of relaying communication is inoperable; confirm communication with the adjacent switch device which is identified, by using the function of relaying communication; and determine whether or not there is a silent failure in the switch device, based on a result of the communication confirmation.

8 Claims, 19 Drawing Sheets

FIG. 3

| PORT NUMBER | PORT STATE | LLDP STATAS | IP ADDRESS | COMMUNICATION STATE | ACL SETTING | ROUTE STATUS |
|---|---|---|---|---|---|---|

FIG. 6

| PORT NUMBER | PORT STATE | LLDP STATAS | IP ADDRESS | COMMUNICATION STATE | ACL SETTING | ROUTE STATUS |
|---|---|---|---|---|---|---|
| 1 | online | NG | - | OK | disable | MARGINAL |
| 2 | online | OK | IPB | OK | disable | GOOD |
| 3 | online | OK | IPC | OK | disable | GOOD |

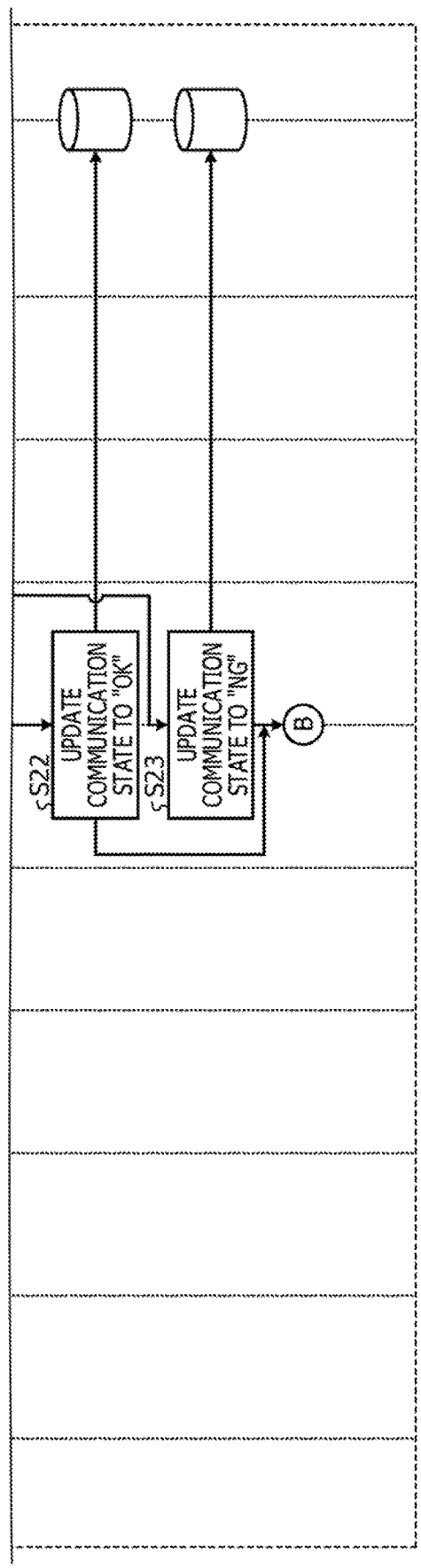

FIG. 8

| PORT NUMBER | PORT STATE | LLDP STATAS | IP ADDRESS | COMMUNICATION STATE | ACL SETTING | ROUTE STATUS |
|---|---|---|---|---|---|---|
| 1 | online | NG | - | OK | disable | MARGINAL |
| 2 | online | OK | IPB | NG | disable | GOOD |
| 3 | online | OK | IPC | NG | disable | GOOD |

FIG. 11

| PORT NUMBER | PORT STATE | LLDP STATAS | IP ADDRESS | COMMUNICATION STATE | ACL SETTING | ROUTE STATUS |
|---|---|---|---|---|---|---|
| 1 | online | NG | - | OK | disable | MARGINAL |
| 2 | online | OK | IPB | NG | disable | POOR |
| 3 | online | OK | IPC | NG | disable | POOR |

FIG. 13

| PORT NUMBER | PORT STATE | LLDP STATUS | IP ADDRESS | COMMUNICATION STATE | ACL SETTING | ROUTE STATUS |
|---|---|---|---|---|---|---|
| 1 | online | NG | - | OK | disable | MARGINAL |
| 2 | online | OK | IPB | NG | enable | POOR |
| 3 | online | OK | IPC | NG | enable | POOR |

SWITCH DEVICE AND RECORDING MEDIUM RECORDING FAILURE DETECTION PROGRAM

CROSS-REFERENCE TO RELATED APPLICATION

This application is based upon and claims the benefit of priority of the prior Japanese Patent Application No. 2018-225058, filed on Nov. 30, 2018, the entire contents of which are incorporated herein by reference.

FIELD

The embodiment discussed herein is related to a switch device and a recording medium.

BACKGROUND

In a network system, a silent failure occurs in some case. The silent failure is a failure that is not detected as an error. As for a switch configured to relay network communication, even when a communication unit thereof is out of order and is in a state unable to relay the communication, a port for communication becomes online and is set in a state capable of receiving the communication in a case where a function other than the function of the communication unit normally operates, whereby a silent failure is caused to occur. When the switch receives a packet in a state of the silent failure, the packet is discarded because the communication unit is out of order. Because of this, when a silent failure occurs in the switch, the network operates like a black hole.

Japanese Laid-open Patent Publication No. 2011-205301 and Japanese Laid-open Patent Publication No. 11-127196 are examples of related art.

SUMMARY

According to an aspect of the embodiments, a switch device includes: a memory; and a processor coupled to the memory and configured to: identify an adjacent switch device using a function that is operable even when a function of relaying communication is inoperable; confirm communication with the adjacent switch device which is identified, by using the function of relaying communication; and determine whether or not there is a silent failure in the switch device, based on a result of the communication confirmation.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of information stored in a switch status storage unit;

FIG. 6 is a diagram illustrating an example of a switch status storage unit after the adjacent switch identifying process is carried out;

FIGS. 7A and 7B are a diagram illustrating a sequence of a communication confirmation process;

FIG. 8 is a diagram illustrating a switch status storage unit of a switch after the communication confirmation process is carried out;

FIG. 11 is a diagram illustrating a switch status storage unit of the switch after the communication failure confirmation process is carried out;

FIG. 13 is a diagram illustrating a switch status storage unit of the switch after the separation process is carried out;

DESCRIPTION OF EMBODIMENTS

Figure 1:
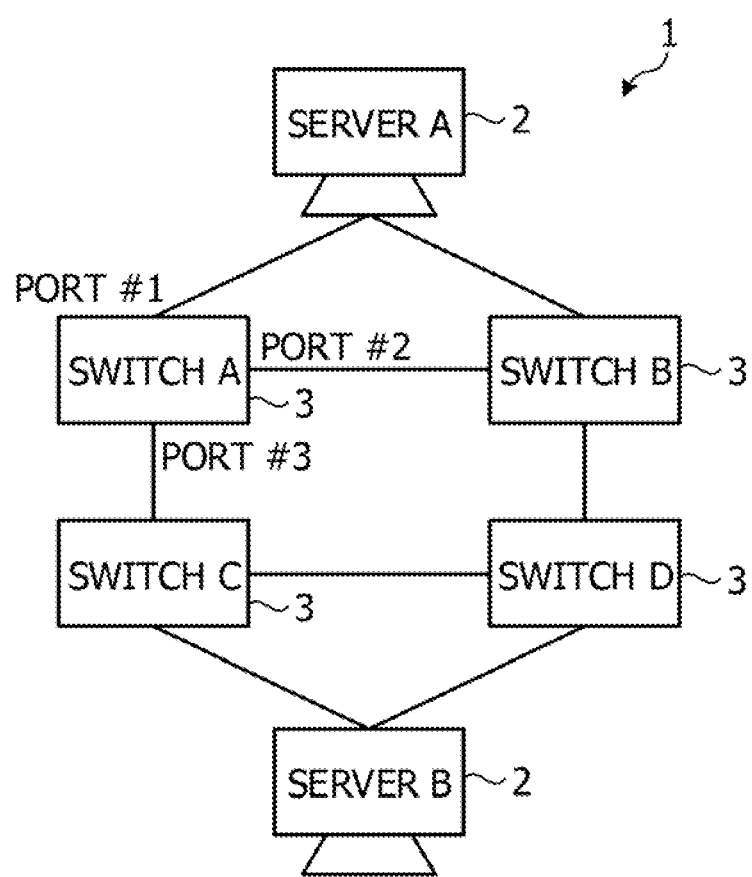
FIG. 1 is a diagram illustrating a configuration of a network system according to an embodiment.

For example, regarding a communication failure, a monitoring priority level is calculated, for each port of a plurality of switch devices, corresponding to a failure occurrence probability of a network route including the port or an apparatus coupled to the port, and the calculated monitoring priority level of each port and each of the ports are displayed being associated with each other. According to this technique, since the port for setting a monitoring target point may be selected based on the monitoring priority level, efficient monitoring may be performed and the failure factor may be quickly found.

For example, it is possible to switch a route without causing interruption of communication, to reduce processing of a routing mechanism for a failure occurrence and recovery, and to suppress the deterioration in performance of the whole network. In this technique, a scheme for monitoring the states of physical ports, lines, and virtual couplings is provided in a switching mechanism of an IP switching node device. Further, the switching mechanism is provided with a scheme for setting logical definitions and physical mapping information of the physical ports/virtual couplings specified when a virtual coupling setting is required from an IP routing mechanism. When a line failure occurrence and a line failure recovery are detected, the route is switched only by the switching mechanism in accordance with the information defined by the above-mentioned setting scheme without making the IP routing mechanism be aware of the failure.

When a silent failure occurs in a switch, there is a problem that the failure may not be detected until it appears in the form of a network breakdown, a system breakdown, or the like. In the case of a silent failure, because a malfunctioning switch is unable to detect that the switch itself is discarding the packets, and other switches and apparatuses coupled to the malfunctioning switch consider the malfunctioning switch as being normal, it takes much time to identify a failure location and make a recovery from the failure.

When the silent failure becomes noticeable, for example, logs of a plurality of switches at a plurality of times are collected to infer the malfunctioning switch by calculating a packet flow rate, or the failure location is inferred by extracting and/or inserting cables. In these days, as data centers become larger in scale, the number of switches constituting a network is increased so that the network configuration becomes complicated. For this reason, the time required for identifying a failure location and recovering from the failure is even more increasing.

An aspect of the present disclosure, a silent failure in a switch may be detected.

Hereinafter, an embodiment of a switch device and a failure detection program according to the present disclosure will be described in detail with reference to the accompanying drawings. Note that the embodiment does not limit the techniques disclosed herein.

EMBODIMENT

First, a configuration of a network system according to an embodiment is described. FIG. 1 is a diagram illustrating the configuration of the network system according to the embodiment. As illustrated in FIG. 1, a network system 1 according to the embodiment includes two servers 2 represented as a server A and a server B, and four switches 3 represented as a switch A to a switch D. The switch A includes three ports represented as a port #1 to a port #3. Although not illustrated in FIG. 1, the other switches 3 also include a plurality of ports.

The switch A is adjacent to the server A via the port #1, is adjacent to the switch B via the port #2, and is adjacent to the switch C via the port #3. The switch B is adjacent to the server A, the switch A, and the switch D. The switch C is adjacent to the server B, the switch A, and the switch D. The switch D is adjacent to the server B, the switch B, and the switch C.

Although the two servers 2 and the four switches 3 are illustrated for convenience of description, the number of servers 2 may be more than or less than two, and the number of switches 3 may also be more than or less than four.

Figure 2:
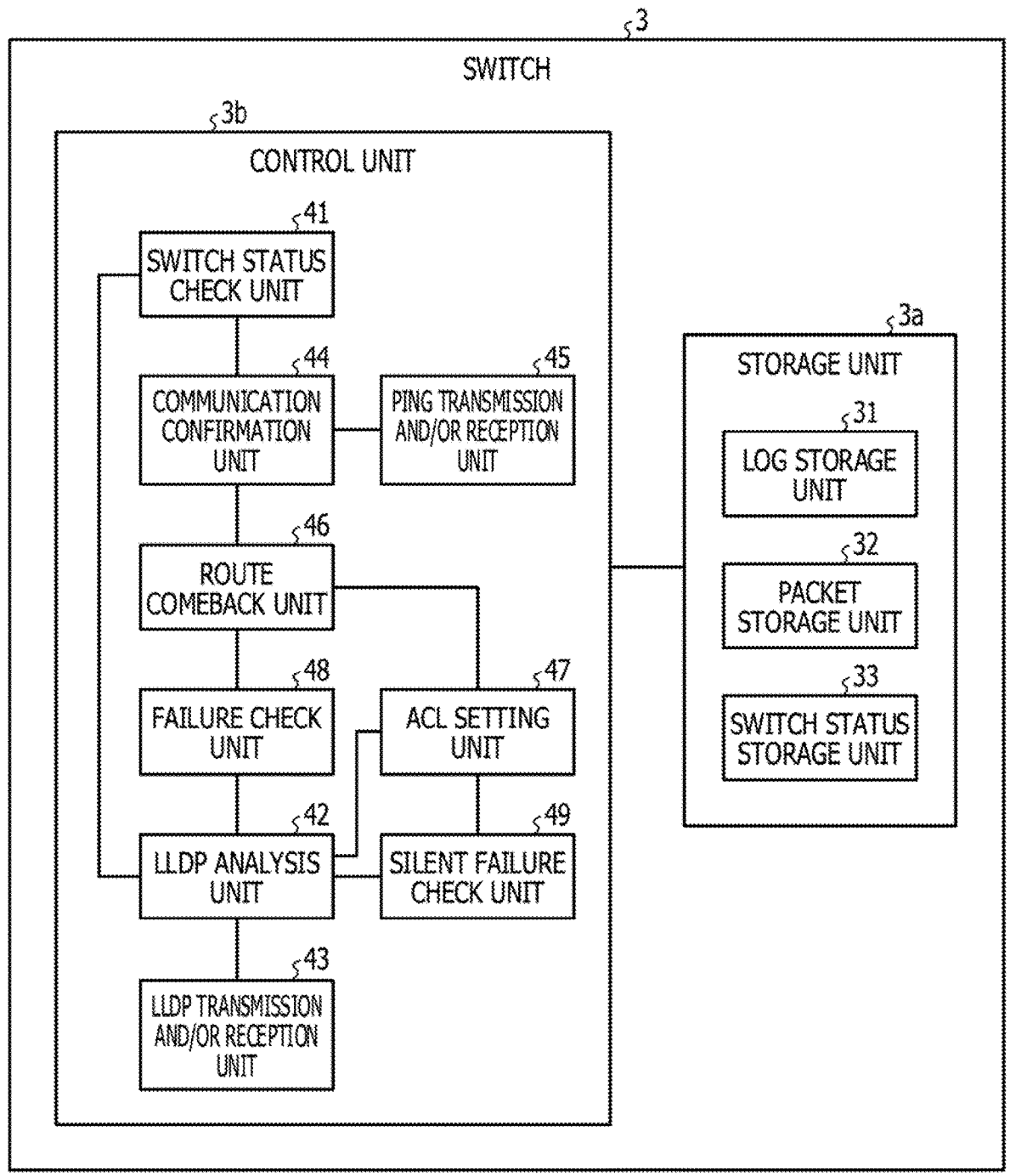
FIG. 2 is a diagram illustrating a functional configuration of a switch.

Next, a functional configuration of the switch 3 will be described. FIG. 2 is a diagram illustrating the functional configuration of the switch 3. As illustrated in FIG. 2, the switch 3 includes a storage unit 3a and a control unit 3b.

The storage unit 3a stores data and the like used when the control unit 3b controls the switch 3. The storage unit 3a includes a log storage unit 31, a packet storage unit 32, and a switch status storage unit 33. The log storage unit 31 stores a log of the switch 3. The packet storage unit 32 stores a packet relayed by the switch 3.

The switch status storage unit 33 stores information about an online port included in the switch 3 for each online port. FIG. 3 is a diagram illustrating an example of the information stored in the switch status storage unit 33. As illustrated in FIG. 3, the switch status storage unit 33 stores a port number, a port state, a Link Layer Discovery Protocol (LLDP) status, an Internet Protocol (IP) address, a communication state, an access control list (ACL) setting, and a route status.

The port number is a number for identifying a port. The port state indicates whether or not the port is online. Since the switch status storage unit 33 stores information about the online port, the port state is normally "online" which indicates an online state.

The LLDP status indicates a result of an inquiry with the LLDP. The LLDP is a protocol for obtaining information of the adjacent switch 3. The LLDP status is either "NG" or "OK". "NG" indicates a case in which an inquiry was made with the LLDP but no response was received, and indicates that a device coupled to the port is not the switch 3. "OK" indicates a case in which an inquiry was made with the LLDP and a response thereto was received, and indicates that a device coupled to the port is the switch 3. The IP address indicates an IP address of the adjacent switch 3 when a device coupled to the port is the switch 3.

The communication state indicates a communication result having been confirmed by transmitting a ping to the adjacent switch 3. The communication state is either "NG" or "OK". "NG" indicates that the communication was not confirmed, and "OK" indicates that the communication was confirmed. The initial state of the communication state is "OK".

The ACL setting indicates the presence or absence of separation of a coupling destination device by the ACL. In a case where an occurrence of a failure is detected and an adjacent device is to be separated, when the port is shut down, a situation in which even the LLDP communication is unable to be performed is brought about. Therefore, the switch 3 separates the adjacent device by the ACL setting. In the ACL setting, availability or non-availability of communication may be set to each data to be communicated for each port, and the switch 3 makes only the LLDP communicable by the ACL setting and separates the adjacent device.

The ACL setting is either "disable" or "enable". The term "disable" indicates that the separation has not been performed by the communication control using the ACL, and "enable" indicates that the separation has been performed by the communication control using the ACL. The initial state of the ACL setting is "disable".

The route status indicates a state of the route including the port. The route status is "Good", "Marginal", or "Poor". "Good" indicates that the route including the port is communicable, "Marginal" indicates that the LLDP status is "NG", and "Poor" indicates that the communication state is "NG" so that it is not possible to perform communication. The initial state of the route status is "Good".

The control unit 3b controls the switch 3 by using the storage unit 3a. The control unit 3b detects a silent failure and separates a failure location. The control unit 3b includes a switch status check unit 41, an LLDP analysis unit 42, an LLDP transmission and/or reception unit 43, a communication confirmation unit 44, a ping transmission and/or reception unit 45, a route comeback unit 46, an ACL setting unit 47, a failure check unit 48, and a silent failure check unit 49.

The switch status check unit 41 detects an online port and updates the port state of the switch status storage unit 33 based on the detected online port. When a port whose port state has been "online" becomes offline, information of the stated port is deleted from the switch status storage unit 33. Then, the switch status check unit 41 requests the LLDP analysis unit 42 to confirm the LLDP for all the online ports, and updates the route status of the switch status storage unit 33 based on the response from the LLDP analysis unit 42. The switch status check unit 41 updates the route status of the port having failed to obtain the confirmation of the LLDP to "Marginal".

The LLDP analysis unit 42 instructs the LLDP transmission and/or reception unit 43 to transmit the LLDP inquiry from all the online ports based on the request from the switch status check unit 41. The LLDP analysis unit 42 updates the LLDP status and the IP address of the switch status storage unit 33 based on the response from the LLDP transmission and/or reception unit 43. The LLDP analysis unit 42 sets the LLDP status to "OK" and stores the IP address for the port having replied, and sets the LLDP status to "NG" for the port having not replied.

The LLDP analysis unit 42 instructs the ACL setting unit 47 to set the ACL so as to perform the separation by using the ACL for the port in which the route status is "Poor" and the ACL setting has not been set yet. The LLDP analysis unit 42 updates the ACL setting of the switch status storage unit 33 to "enable".

The LLDP transmission and/or reception unit 43 transmits the LLDP inquiry to all the online ports based on the instruction of the LLDP analysis unit 42, and passes the IP address to the LLDP analysis unit 42 for the online port having responded to the inquiry.

The communication confirmation unit 44 instructs the ping transmission and/or reception unit 45 to transmit a ping by using the IP address stored in the switch status storage unit 33. Subsequently, the communication confirmation unit 44 receives the ping transmission result from the ping transmission and/or reception unit 45, and updates the communication state of the switch status storage unit 33 to "NG" for the port having failed to obtain the response.

The ping transmission and/or reception unit 45 transmits a ping to the adjacent switch 3 based on the instruction of the communication confirmation unit 44, and then sends a response, to the communication confirmation unit 44, telling the presence or absence of the response from the adjacent switch 3.

When a route whose route status was "Poor" has been restored, the route comeback unit 46 automatically restores the route to a communicable state. When the route is restored and an LLDP response is received, the route comeback unit 46 automatically restores the port having replied.

For example, the route comeback unit 46 extracts a port whose route status is "Poor", confirms the LLDP status for the extracted port, and determines that the route has been restored when the LLDP status is "OK". The route comeback unit 46 initializes the corresponding entry in the switch status storage unit 33, and instructs the ACL setting unit 47 to delete the ACL setting.

The ACL setting unit 47 performs ACL setting for enabling only the LLDP to be communicable, based on the instruction of the LLDP analysis unit 42. The ACL setting unit 47 deletes the ACL setting for enabling only the LLDP to be communicable, based on the instruction of the route comeback unit 46.

Among the ports of unsuccessful ping communication, for example, among the ports whose communication states in the switch status storage unit 33 are "NG", the failure check unit 48 changes the route status of the port to "Poor" when the route status of the stated port is other than "Poor".

The silent failure check unit 49 determines whether the separation is caused by the device in which the silent failure check unit 49 works or caused by another switch 3, for example, determines whether or not the device in which the silent failure check unit 49 works causes a silent failure; the silent failure check unit 49 separates also the route that is not coupled to the switch in the case where the device in which the silent failure check unit 49 works causes the silent failure. The silent failure check unit 49 reports to the network administrator and turns on a port LED.

When the device itself causes a silent failure, all the route statuses of the coupling ports with the adjacent switches 3 become "Poor". The silent failure check unit 49 determines whether or not all the route statuses of the coupling ports with the adjacent switches 3 are "Poor", thereby determining whether or not the device in which the silent failure check unit 49 works causes the silent failure.

The failure check unit 48 sets the route status of the port whose communication state is "NG" to "Poor". Therefore, the communication state of the port in which the route status of the coupling port with the adjacent switch 3 is "Poor" is "NG". Accordingly, the failure check unit 48 may determine whether or not the device in which the silent failure check unit 49 works causes a silent failure, by determining whether or not all the communication states of the coupling ports with the adjacent switches 3 are "NG".

As an example of a route coupled to a device other than the switch, there is a route coupled to the server 2. The server 2 coupled to the switch 3, which has caused a silent failure, transmits a communication packet to the stated switch 3 while assuming that the switch 3 to which the server 2 is coupled is normal, which affects the server 2 adversely. In order to suppress such an adverse effect, the silent failure check unit 49 also separates the route whose route status is "Marginal". In this manner, the silent failure check unit 49 is able to completely separate the failure by separating also the route whose route status is "Marginal".

Figure 4:
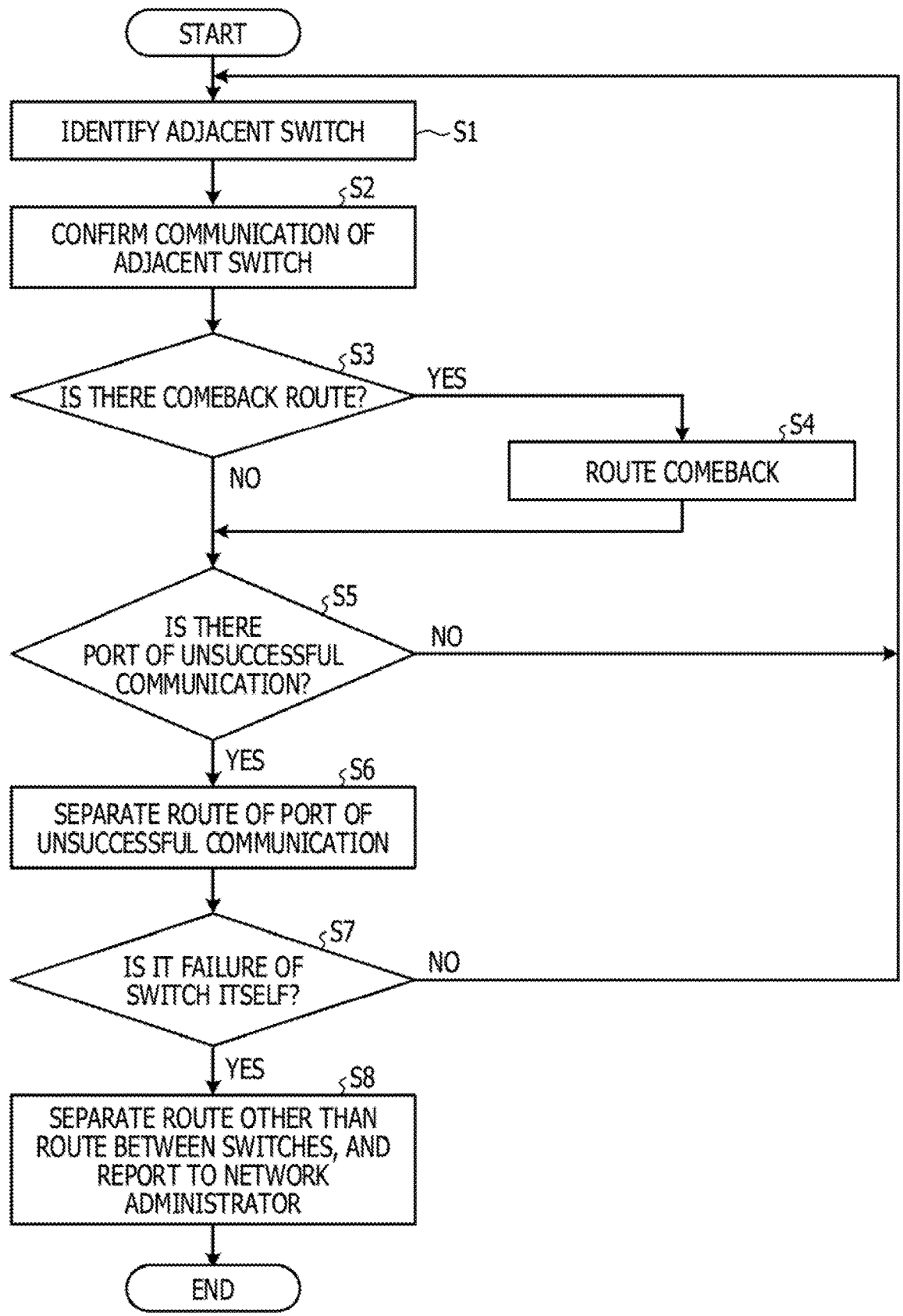
FIG. 4 is a flowchart illustrating a flow of a silent failure process carried out by a switch.

Next, a flow of a silent failure process carried out by the switch 3 will be described. FIG. 4 is a flowchart illustrating the flow of the silent failure process carried out by the switch 3. As illustrated in FIG. 4, the switch 3 identifies the adjacent switch 3 by using the LLDP (step S1), and confirms the communication of the identified adjacent switch 3 by using a ping (step S2).

Then, the switch 3 determines whether or not there is a comeback route among the previously separated routes (step S3), and when there is a comeback route, the switch 3 makes the comeback route available (step S4). Subsequently, the switch 3 determines whether or not there is a port of unsuccessful communication (step S5), and when there is no port of unsuccessful communication, the process returns to step S1.

On the other hand, when there is a port of unsuccessful communication, the switch 3 separates the route of the port of unsuccessful communication (step S6). When there is a plurality of ports of unsuccessful communication, the switch 3 separates the routes of all the ports of unsuccessful communication. Then, the switch 3 determines whether or not the failure is a failure of the switch 3 itself based on whether or not the communications with all the adjacent switches 3 are unsuccessful (step S7), and when it is not a failure of the switch 3 itself, the process returns to step S1. On the other hand, in the case where the failure is caused by the switch 3 itself, the switch 3 separates the routes other than the route between the switches, and reports to the network administrator (step S8).

In this manner, the switch 3 identifies the adjacent switch 3 using the LLDP, and confirms the communication of the identified adjacent switch 3 by using the ping. Then, the switch 3 determines whether or not there is a failure in the switch 3 itself based on whether or not the communications with all the adjacent switches 3 are unsuccessful, thereby making it possible to detect a silent failure.

Figure 5A:
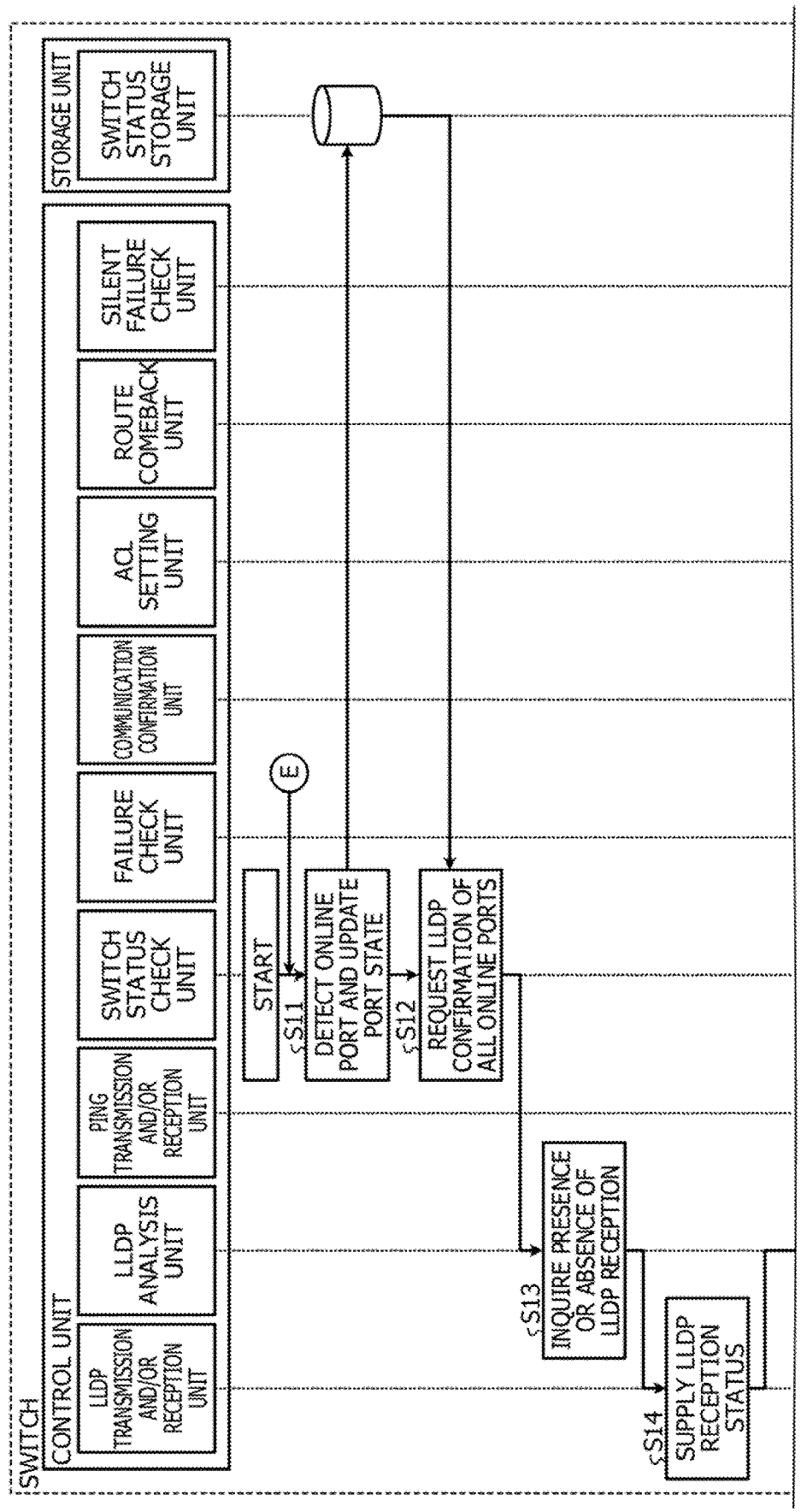
FIGS. 5A and 5B are a diagram illustrating a sequence of an adjacent switch identifying process.
Figure 5B:
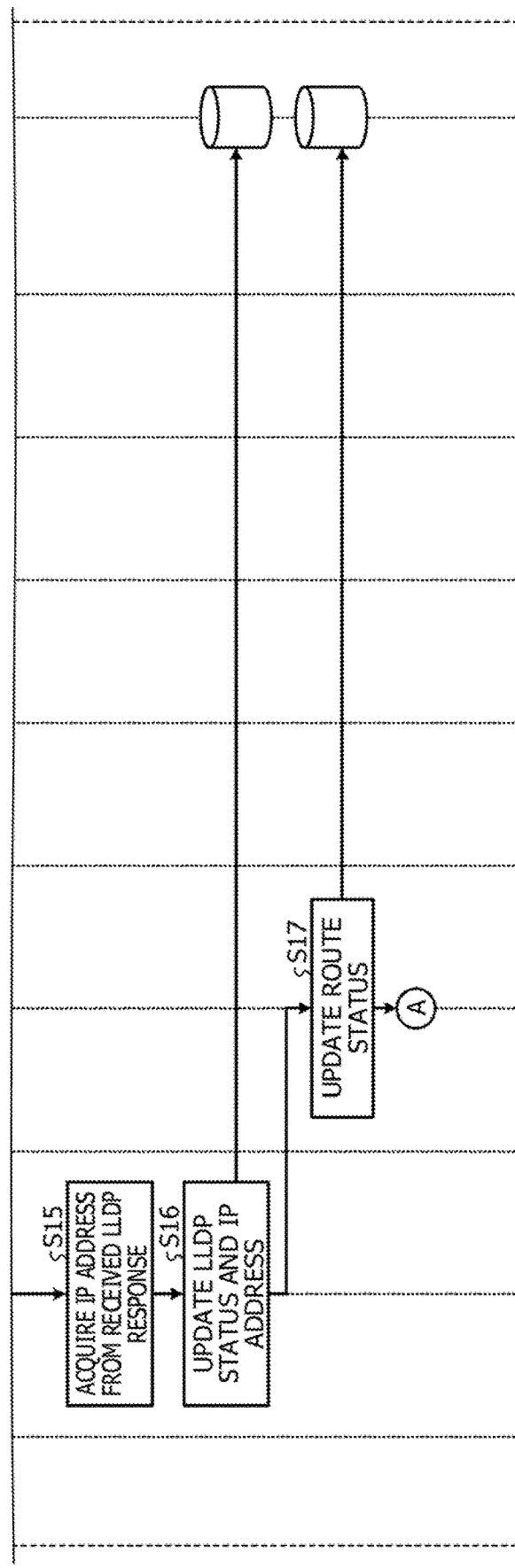

Next, a sequence of the silent failure process carried out by the switch 3 will be described with reference to FIG. 5A to FIG. 15. FIGS. 5A and 5B are a diagram illustrating a sequence of an adjacent switch identifying process. As illustrated in FIGS. 5A and 5B, the switch status check unit 41 detects an online port, and updates the port state of the switch status storage unit 33 (step S11). Then, the switch status check unit 41 requests the LLDP analysis unit 42 to perform the LLDP confirmation of all the online ports (step S12).

The LLDP analysis unit 42 sends, to the LLDP transmission and/or reception unit 43, an inquiry about the presence or absence of the LLDP reception (step S13). The LLDP transmission and/or reception unit 43 performs transmission using the LLDP toward the adjacent device, and supplies the LLDP reception status to the LLDP analysis unit 42 (step S14). The LLDP analysis unit 42 acquires an IP address from the LLDP response received by the LLDP transmission and/or reception unit 43 (step S15), and updates the LLDP status and the IP address of the switch status storage unit 33 (step S16).

Subsequently, the switch status check unit 41 updates the route status of the switch status storage unit 33 (step S17). Then, the switch 3 shifts to a communication confirmation process illustrated in FIG. 7. FIG. 6 is a diagram illustrating an example of the switch status storage unit 33 after the adjacent switch identifying process is carried out. FIG. 6 illustrates the switch status storage unit 33 of the switch A in the case where a silent failure has occurred in the switch A in the network system 1 illustrated in FIG. 1.

As illustrated in FIG. 6, since the port #1 is coupled to the server A, the LLDP status is "NG". Since the port #2 and port #3 are coupled to the adjacent switches B and C respectively, the LLDP statuses thereof are "OK" and IP addresses "IPB" and "IPC" are respectively stored.

All the communication states are "OK" as the initial states, and all the ACL settings are "disable" as the initial states. The route status of the port #1 is updated to "Marginal" since the LLDP status is "NG". Since the LLDP status is "OK", the route status of each of the port #2 and the port #3 remains "Good", which is the initial state.

Figure 7A:
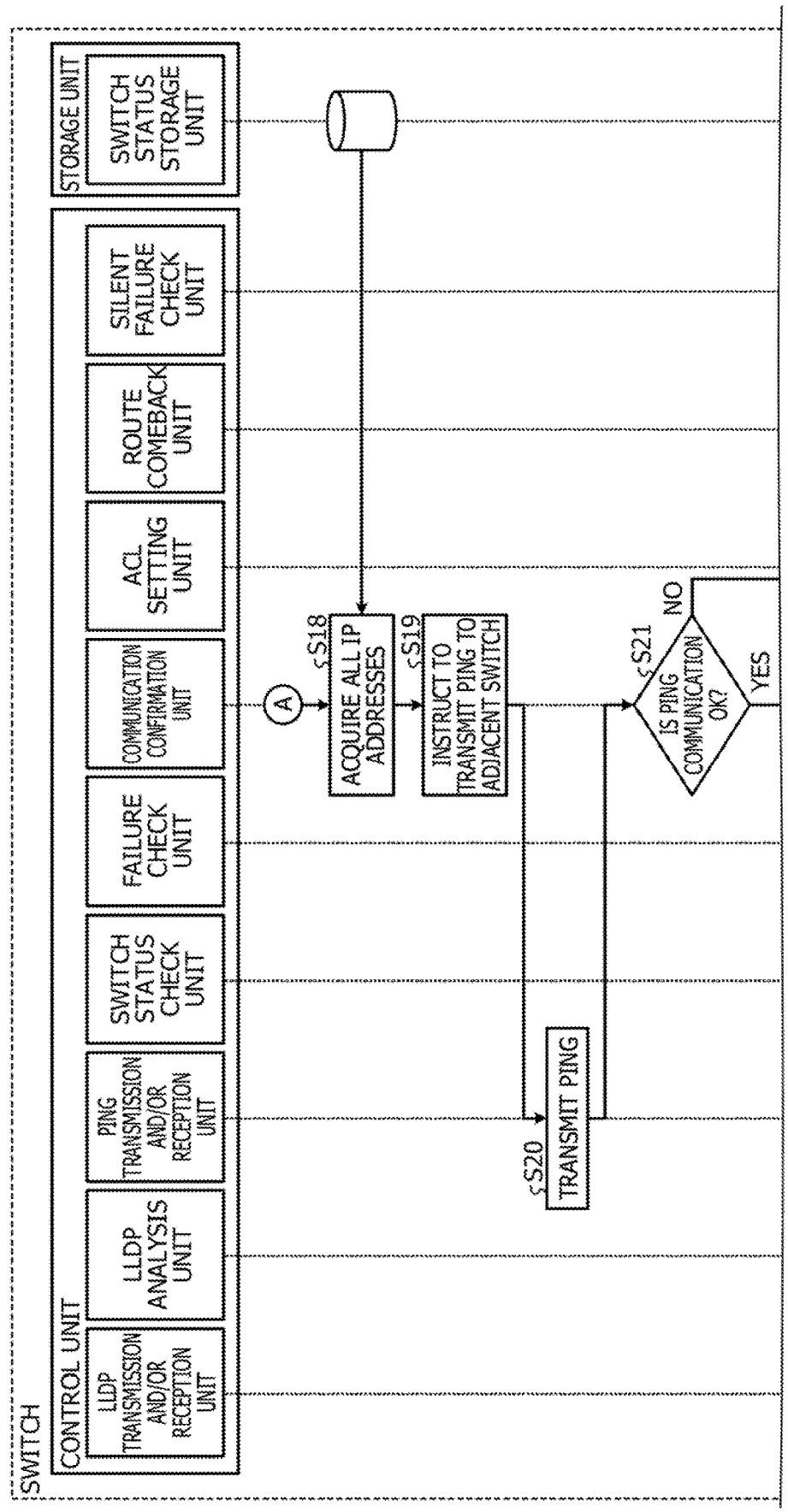

FIGS. 7A and 7B are a diagram illustrating a sequence of a communication confirmation process. As illustrated in FIG. 7, the communication confirmation unit 44 acquires all the IP addresses stored in the switch status storage unit 33 (step S18), and instructs the ping transmission and/or reception unit 45 to transmit a ping to each of the adjacent switches 3 by using the acquired IP address (step S19).

The ping transmission and/or reception unit 45 transmits a ping to the adjacent switch 3 (step S20), and passes a result of the communication confirmation to the communication confirmation unit 44. The communication confirmation unit 44 determines whether or not the ping communication is OK (step S21). When the ping communication is OK, the communication confirmation unit 44 updates the communication state of the switch status storage unit 33 to "OK" (step S22); when the ping communication is not OK, the communication confirmation unit 44 updates the communication state of the switch status storage unit 33 to "NG" (step S23). The communication confirmation unit 44 carries out the processing of step S21 to step S23 for all the adjacent switches 3 to which the ping has been transmitted. Then, the switch 3 shifts to a route comeback process illustrated in FIG. 9.

FIG. 8 is a diagram illustrating the switch status storage unit 33 of the switch A after the communication confirmation process is carried out. As illustrated in FIG. 8, since a silent failure has occurred in the switch A, the switch A is able to perform the ping communication with none of the switch B and the switch C; accordingly, the communication confirmation results of the port #2 and the port #3 are updated to "NG".

Figure 9:
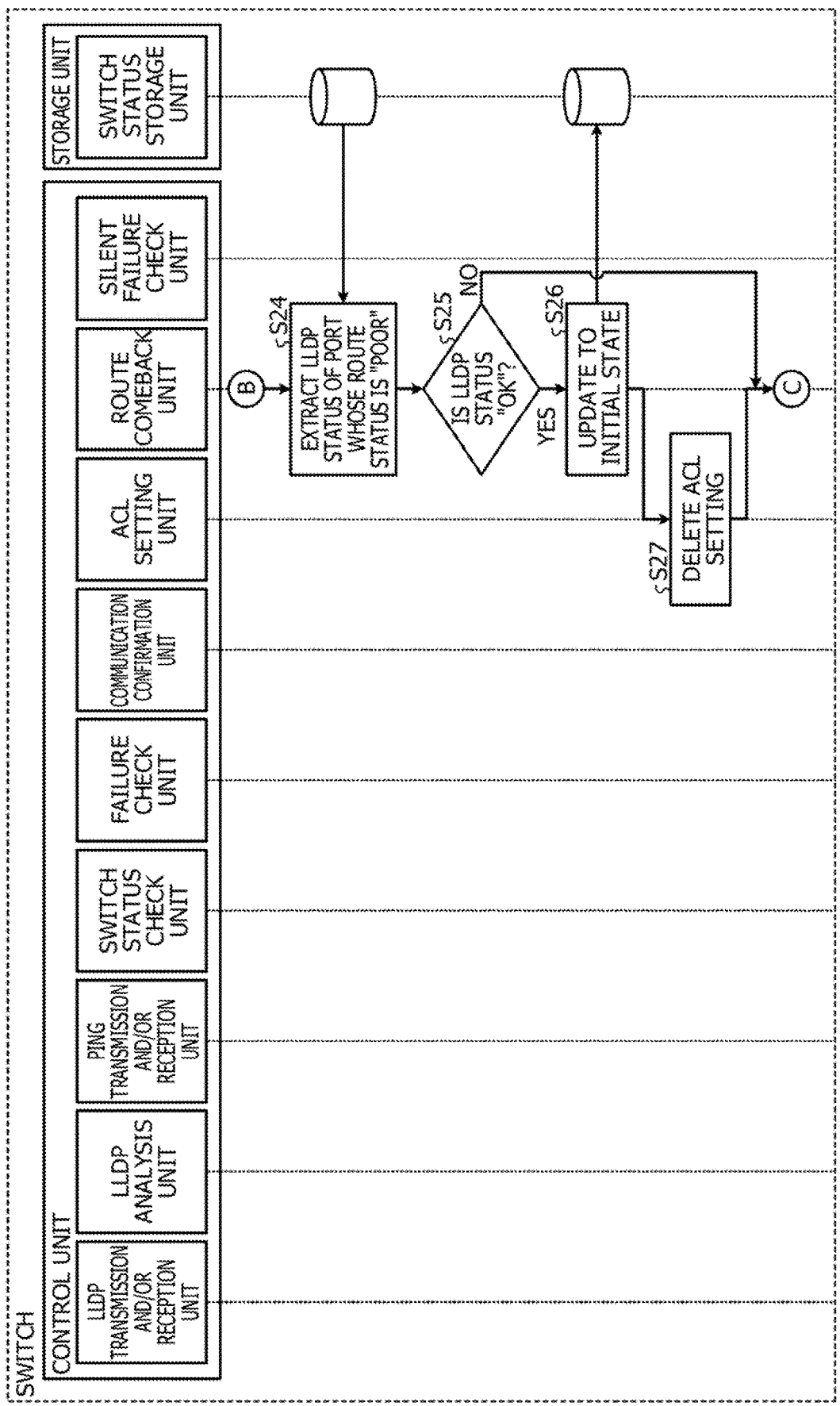
FIG. 9 is a diagram illustrating a sequence of a route comeback process.

FIG. 9 is a diagram illustrating a sequence of the route comeback process. As illustrated in FIG. 9, the route comeback unit 46 extracts the LLDP status of the port whose route status is "Poor" from the switch status storage unit 33 (step S24). Subsequently, the route comeback unit 46 determines whether or not the LLDP status is "OK" (step S25); when it is "OK", the route comeback unit 46 updates the corresponding entry in the switch status storage unit 33 to the initial state (step S26), and instructs the ACL setting unit 47 to delete the ACL setting. The ACL setting unit 47 deletes the corresponding ACL setting (step S27).

The route comeback unit 46 carries out the processing of step S25 to step S27 for all the extracted LLDP statuses. Then, the switch 3 shifts to a communication failure confirmation process illustrated in FIG. 10.

Figure 10:
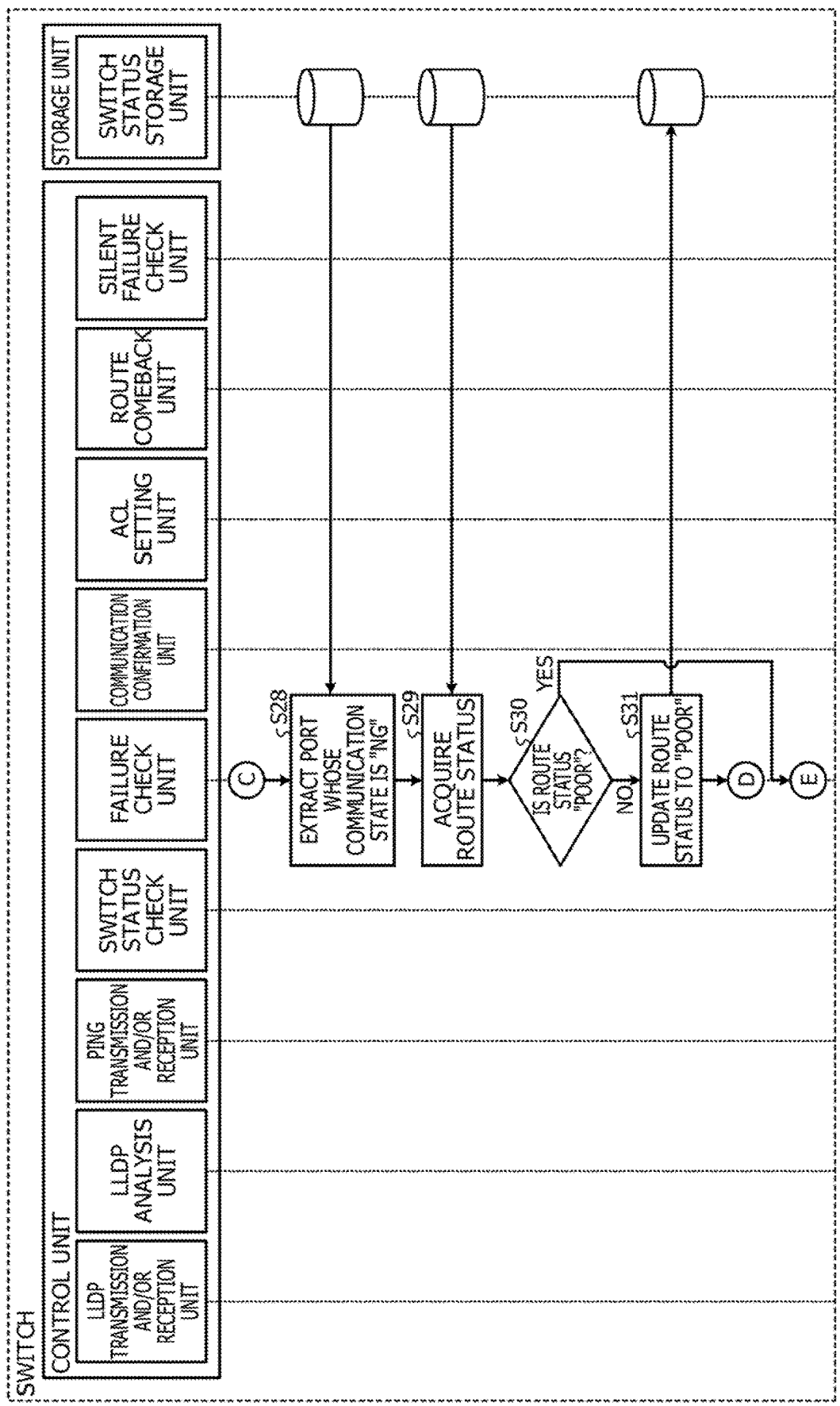
FIG. 10 is a diagram illustrating a sequence of a communication failure confirmation process.

FIG. 10 is a diagram illustrating a sequence of the communication failure confirmation process. As illustrated in FIG. 10, the failure check unit 48 extracts a port whose communication state is "NG" from the switch status storage unit 33 (step S28), and acquires the route status of the extracted port (step S29). Subsequently, the failure check unit 48 determines whether or not the route status is "Poor" (step S30), and when it is not "Poor", the failure check unit 48 updates the route status to "Poor" (step S31).

The failure check unit 48 carries out the processing of step S30 and step S31 for all the ports that have been acquired. Then, the switch 3 shifts to a separation process illustrated in FIG. 12.

FIG. 11 is a diagram illustrating the switch status storage unit 33 of the switch A after the communication failure confirmation process is carried out. As illustrated in FIG. 11, the route status of each of the port #2 and the port #3 whose communication states are "NG" is updated to "Poor".

Figure 12A:
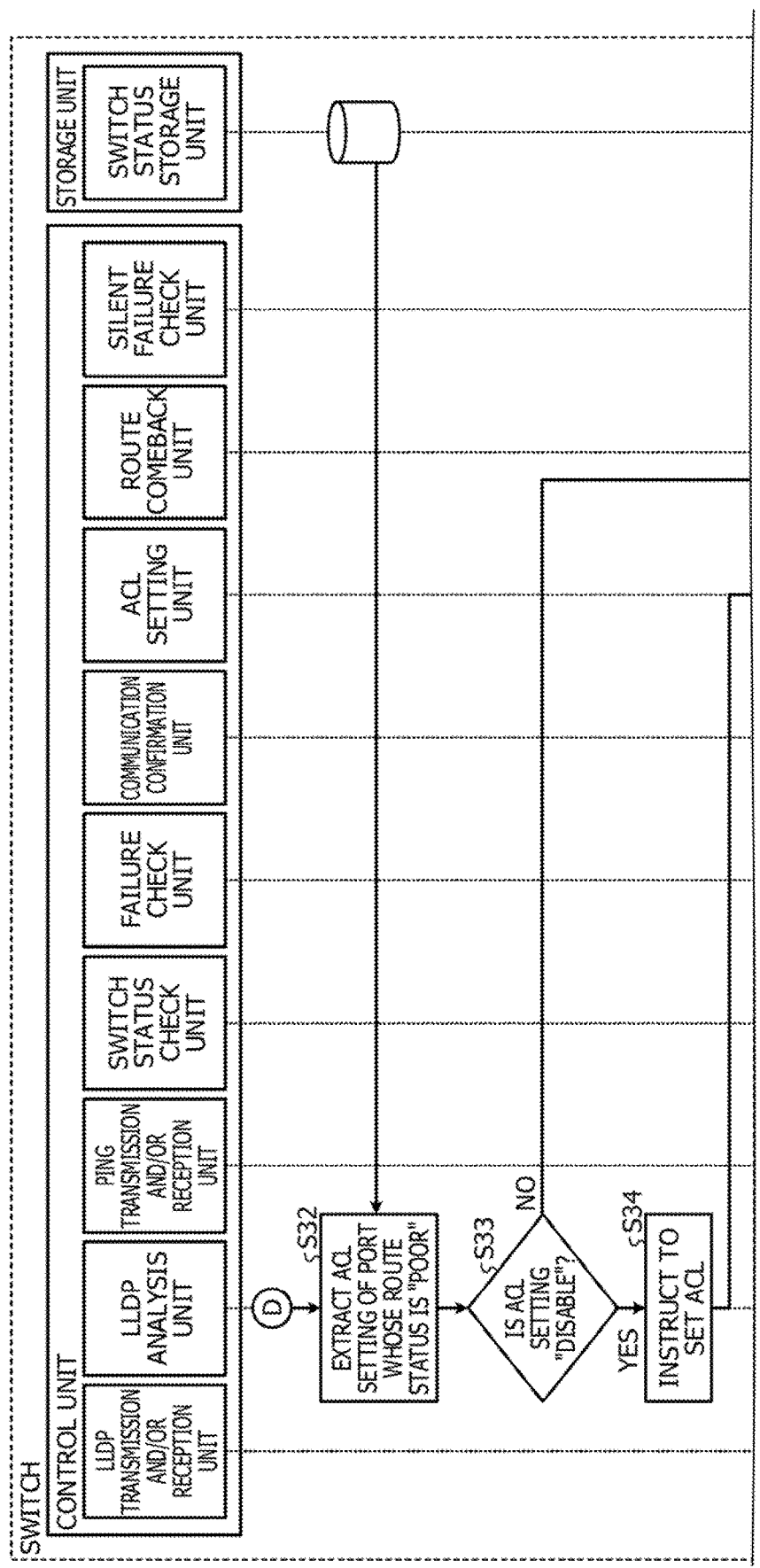
FIGS. 12A and 12B are a diagram illustrating a sequence of a separation process.
Figure 12B:
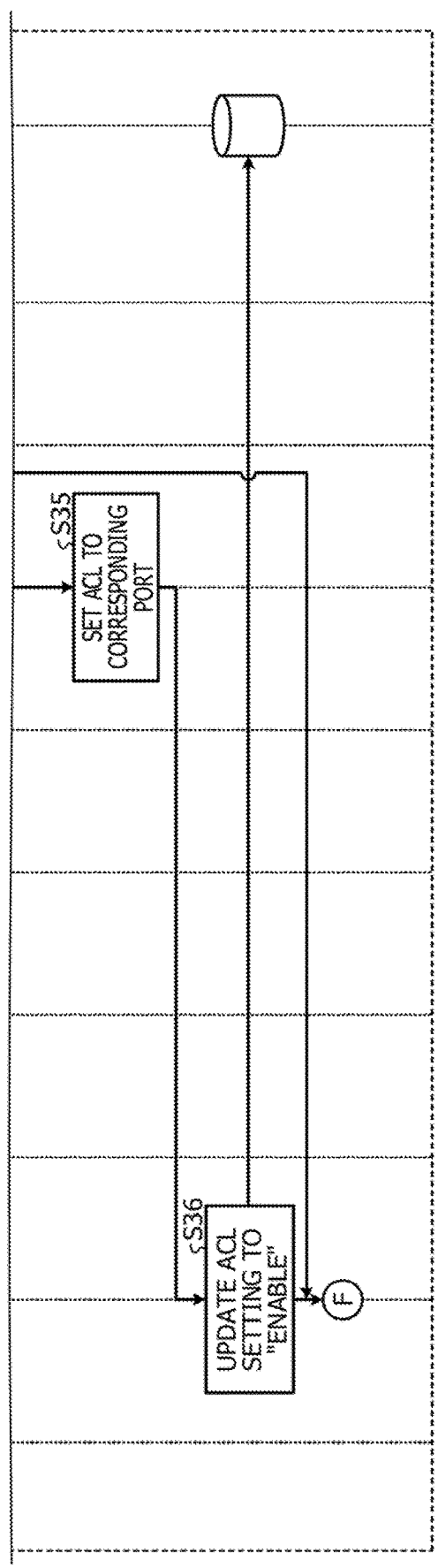

FIGS. 12A and 12B are a diagram illustrating a sequence of the separation process. As illustrated in FIGS. 12A and 12B, the LLDP analysis unit 42 extracts the ACL setting of the port whose route status is "Poor" from the switch status storage unit 33 (step S32). Subsequently, the LLDP analysis unit 42 determines whether or not the ACL setting is "disable" (step S33), and when the ACL setting is "disable", the LLDP analysis unit 42 instructs the ACL setting unit 47 to set the ACL (step S34).

In response to the instruction, the ACL setting unit 47 sets the ACL to the corresponding port (step S35). When the ACL setting is completed, the LLDP analysis unit 42 updates the ACL setting of the switch status storage unit 33 to "enable" (step S36).

The LLDP analysis unit 42 carries out the processing of step S33 to step S36 for all the extracted ACL settings. Then, the switch 3 shifts to a failure location determination process illustrated in FIG. 14.

FIG. 13 is a diagram illustrating the switch status storage unit 33 of the switch A after the separation process is carried out. As illustrated in FIG. 13, the ACL settings of the port #2 and port #3 whose route statuses are "Poor" are updated to "enable".

Figure 14:
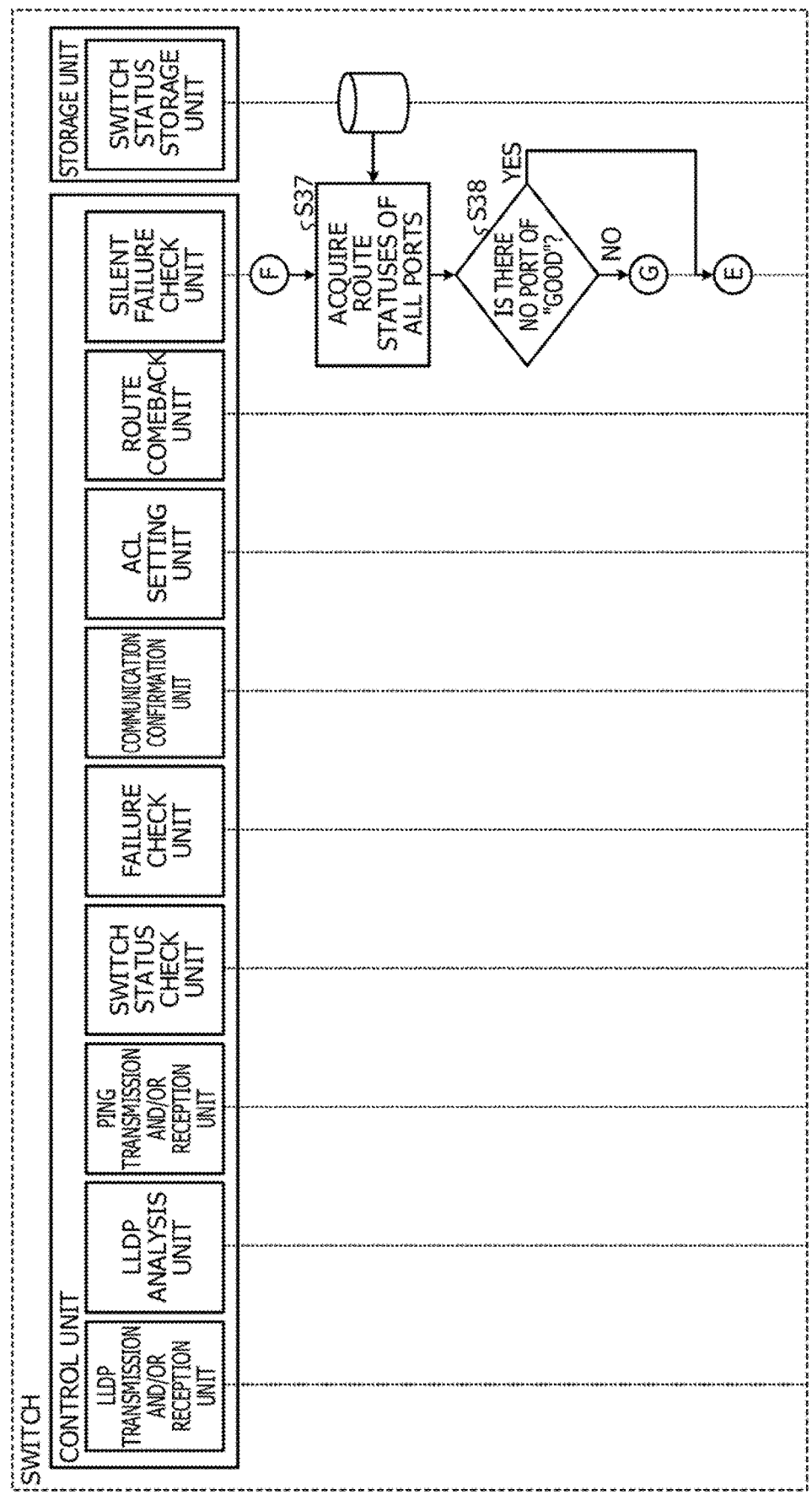
FIG. 14 is a diagram illustrating a sequence of a failure location determination process.

FIG. 14 is a diagram illustrating a sequence of the failure location determination process. As illustrated in FIG. 14, the silent failure check unit 49 acquires the route statuses of all the ports from the switch status storage unit 33 (step S37), and determines whether or not there is a port of "Good" among the route statuses of all the ports (step S38). When there is a port of "Good" among the route statuses of all the ports, the switch 3 returns to step S11 in FIG. 5. On the other hand, when there is no port of "Good" among the route statuses of all the ports, since a silent failure has occurred, the silent failure check unit 49 shifts to a separation process of a route other than the route between the switches illustrated in FIG. 15.

Figure 15:
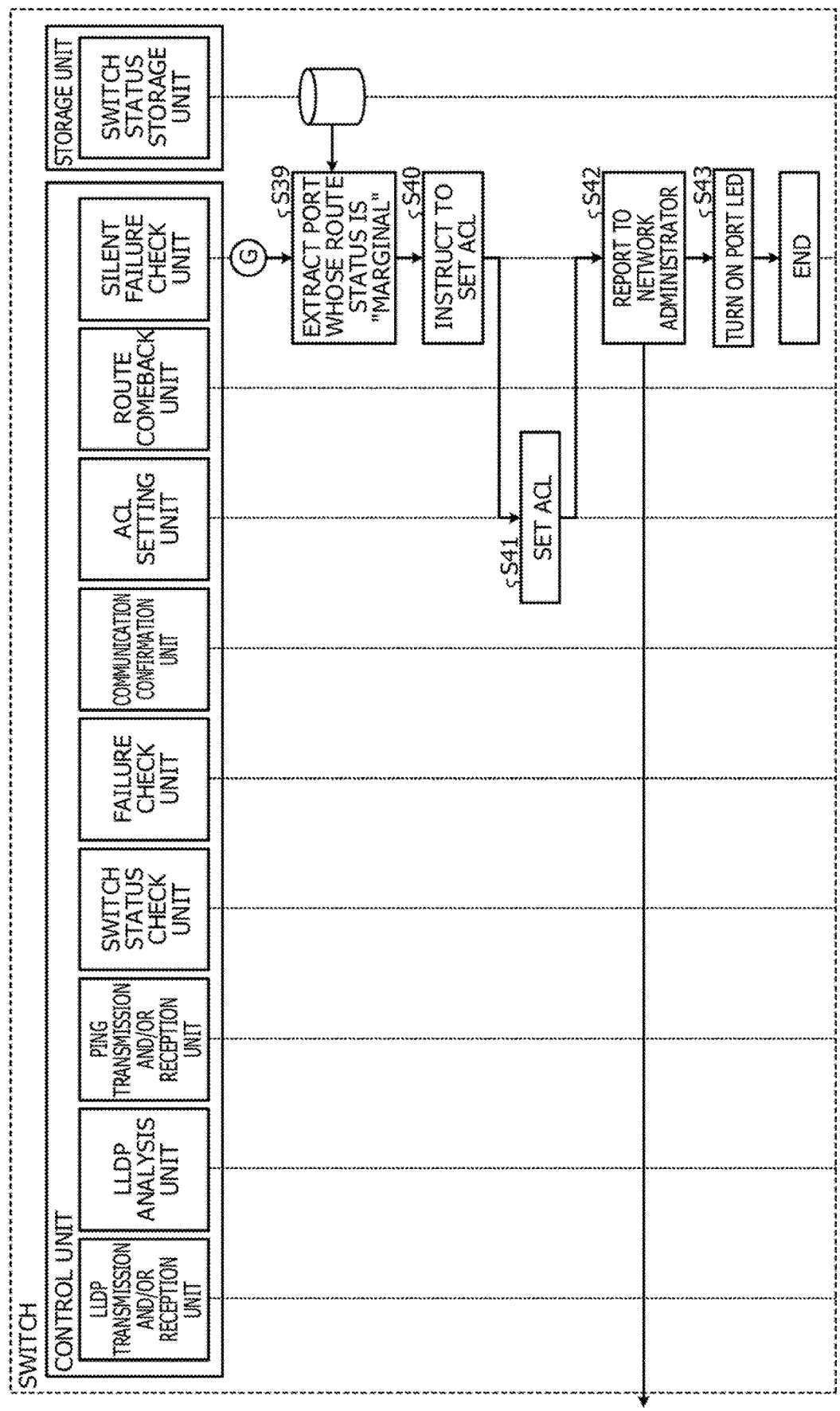
FIG. 15 is a diagram illustrating a sequence of a separation process of a route other than the route between the switches.

FIG. 15 is a diagram illustrating a sequence of the separation process of a route other than the route between the switches. As illustrated in FIG. 15, the silent failure check unit 49 extracts a port whose route status is "Marginal" from the switch status storage unit 33 (step S39), and instructs the ACL setting unit 47 to set the ACL of the extracted port (step S40). The ACL setting unit 47 sets the ACL based on the instruction (step S41).

The silent failure check unit 49 reports the silent failure of the device in which the silent failure check unit 49 works to the network administrator (step S42), and turns on the port LED (step S43).

In this manner, the switch 3 is able to detect a silent failure in the switch 3 itself and separate the switch 3, by performing the adjacent switch identifying process, the communication confirmation process, the route comeback process, the communication failure confirmation process, the separation process, the failure location determination process, and the separation process of the route other than the route between the switches.

Figure 16:
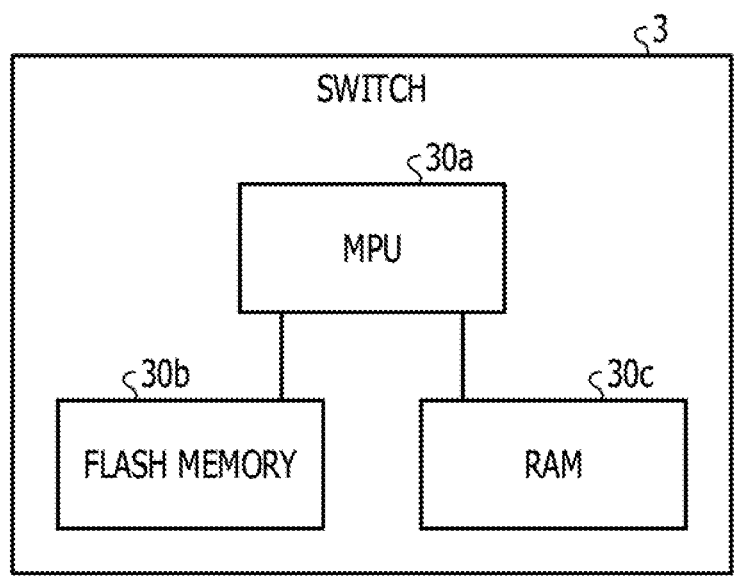
FIG. 16 is a diagram illustrating a hardware configuration of a switch.

The functions illustrated in FIG. 2 are enabled by executing a failure detection program by a microprocessor unit (MPU) included in the switch 3. A hardware configuration of the switch 3 will now be described. FIG. 16 is a diagram illustrating the hardware configuration of the switch 3. As illustrated in FIG. 16, the switch 3 includes an MPU 30a, a flash memory 30b, and a random-access memory (RAM) 30c.

The MPU 30a is a processing unit configured to read out the failure detection program stored in the RAM 30c and execute the stated program. The flash memory 30b is a nonvolatile memory for storing the failure detection program. The RAM 30c is a volatile memory for storing the failure detection program having been read out from the flash memory 30b. The RAM 30c stores data required to execute the failure detection program, an intermediate result of the execution of the failure detection program, and the like.

The failure detection program may be supplied in the form of a movable recording medium such as a DVD or a CD-ROM on which the failure detection program is recorded. The failure detection program may be stored in a storage device of a server computer, and then may be transferred from the server computer to the switch 3 via the network.

As described above, in the embodiment, the switch status check unit 41 identifies the adjacent switch 3 using the LLDP, and the communication confirmation unit 44 confirms the communication of the adjacent switch 3 by using the ping. When there is no adjacent switch 3 confirmed to be communicable, the silent failure check unit 49 determines that there is a silent failure in the device in which it works. Accordingly, the switch 3 is able to detect a silent failure.

In addition, in the embodiment, since the LLDP analysis unit 42 separates, by the ACL setting, a route with which communication with the adjacent switch 3 was not confirmed, it is possible to automatically restore the route that has become communicable.

Further, in the embodiment, when the silent failure check unit 49 determines that a silent failure has occurred in the device in which it works, the silent failure check unit 49 separates a route coupled with the adjacent device other than the adjacent switch by the ACL setting, thereby making it possible to suppress a situation in which the silent failure affects the adjacent device adversely.

In addition, in the embodiment, when the adjacent switch 3 once separated by the LLDP analysis unit 42 is newly identified as the adjacent switch 3 by the switch status check unit 41, the route comeback unit 46 deletes the ACL setting. Therefore, the switch 3 is able to automatically restore the route coupled with the restored adjacent switch 3.

In the embodiment, the case in which the adjacent switch 3 is identified by using the LLDP is described. However, the switch status check unit 41 may identify the adjacent switch 3 by using another function that is operable even when the function of relaying the communication is inoperable.

In addition, although the case in which the communication confirmation is performed by using the ping in the embodiment, the communication confirmation unit 44 may confirm the communication by using another function used when relaying the communication, such as an Address Resolution Protocol (ARP) or a gratuitous ARP (GARP).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A switch device comprising:
a memory; and
a processor coupled to the memory, a device which is not another switch device and one or more adjacent switch devices to the switch device and configured to:
identify one adjacent switch device of the one or more adjacent switch devices using a function that is operable even when a function of relaying communication is inoperable;
confirm communication with the one adjacent switch device which is identified, by using the function of relaying communication;
determine whether there is a silent failure in the switch device, based on a result of the communication confirmation; and
performing, when determining that there is a silent failure in the switch device, communication control by an access control list (ACL) on communication with the device other than the one or more adjacent switch devices to separate the device.

2. The switch device according to claim 1, wherein the processor is configured to: separate the one adjacent switch device the communication with which is not confirmed by performing communication control by the ACL on communication with the adjacent switch device.

3. The switch device according to claim 2, wherein the processor is configured to: cancel, when an adjacent switch device which is included in the one or more adjacent switch devices and is once separated is identified as the one adjacent switch device, the separation of the adjacent switch device by releasing the communication control by the ACL.

4. The switch device according to claim 1, wherein the processor is configured to identify the adjacent switch device by using a Link Layer Discovery Protocol (LLDP).

5. The switch device according to claim 1, wherein the processor is configured to confirm the communication with the one adjacent switch device which is identified, by using a ping.

6. A non-transitory computer-readable recording medium having stored therein a program for causing a computer to execute a process for failure detection, the process comprising:
- identifying one adjacent switch device of one or more adjacent switch devices coupled to a switch device which is coupled to a device which is not another switch device by using a function that is operable even when a function of relaying communication is inoperable;
- confirming communication with the identified one adjacent switch device, by using the function of relaying communication;
- determining whether or not there is a silent failure in a device in which the computer works, based on a result of the communication confirmation; and
- performing, when determining that there is a silent failure in the switch device, communication control by an access control list (ACL) on communication with the device other than the one or more adjacent switch devices to separate the device.

7. The non-transitory computer-readable recording medium according to claim 6, the process further comprising: separating the one adjacent switch device the communication with which is not confirmed by performing communication control by the ACL on communication with the adjacent switch device.

8. The non-transitory computer-readable recording medium according to claim 7, the process further comprising: canceling, when an adjacent switch device which is included in the one or more adjacent switch devices and is once separated is identified, the separation of the one adjacent switch device by releasing the communication control by the ACL.

* * * * *